(12) United States Patent
Aist et al.

(10) Patent No.: US 10,762,777 B2
(45) Date of Patent: Sep. 1, 2020

(54) NAVIGATION SYSTEM WITH SONIC ANALYSIS MECHANISM AND METHOD OF OPERATION THEREOF

(71) Applicant: Telenav, Inc., Santa Clara, CA (US)

(72) Inventors: Gregory Stewart Aist, Santa Clara, CA (US); Shalu Grover, Sunnyvale, CA (US); Casey Carter, Sunnyvale, CA (US); Jinghai Ren, Milpitas, CA (US); Michele Santamaria, Seaside, CA (US)

(73) Assignee: Telenav, Inc., Santa Clara, CA (US)

(*) Notice: Subject to any disclaimer, the term of this patent is extended or adjusted under 35 U.S.C. 154(b) by 0 days.

(21) Appl. No.: 15/985,302

(22) Filed: May 21, 2018

(65) Prior Publication Data

US 2019/0355247 A1  Nov. 21, 2019

(51) Int. Cl.
*G08G 1/00* (2006.01)
*G08G 1/04* (2006.01)
*B60W 50/14* (2020.01)
*B60W 40/02* (2006.01)
*G05D 1/00* (2006.01)

(52) U.S. Cl.
CPC ............... *G08G 1/04* (2013.01); *B60W 40/02* (2013.01); *B60W 50/14* (2013.01); *G05D 1/0088* (2013.01); *B60W 2050/143* (2013.01); *B60W 2050/146* (2013.01); *B60W 2420/54* (2013.01); *B60W 2554/801* (2020.02); *G05D 2201/0213* (2013.01)

(58) Field of Classification Search
USPC ............ 340/902, 903, 906, 933, 943, 425.5, 340/426.24, 438, 435
See application file for complete search history.

(56) References Cited

U.S. PATENT DOCUMENTS

| | | | |
|---|---|---|---|
| 8,676,427 B1 | 3/2014 | Ferguson et al. | |
| 9,020,661 B2 | 4/2015 | Sugihara | |
| 2002/0008635 A1* | 1/2002 | Ewing | G08G 1/0965 340/902 |
| 2004/0178892 A1* | 9/2004 | Anderson | B60Q 1/2665 340/435 |
| 2008/0150755 A1* | 6/2008 | Van Zandt | G08G 1/0965 340/902 |

(Continued)

FOREIGN PATENT DOCUMENTS

EP  3133454 A1  2/2017

OTHER PUBLICATIONS

Irman Abdić et al. "Detecting Road Surface Wetness from Audio: A Deep Learning Approach" (published in:) 2016 23rd International Conference on Pattern Recognition (ICPR), Dec. 4, 2016.

*Primary Examiner* — Brent Swarthout
(74) *Attorney, Agent, or Firm* — Perspectives Law Group, Corp.

(57) ABSTRACT

A navigation system includes: a communication unit configured to receive a vehicle external environment information of a user vehicle; and a control unit, coupled to the communication unit, configured to: identify a sonic event from the vehicle external environment information; calculate an event position information of the sonic event relative to the user vehicle; and generate a vehicle operation instruction based on the sonic event and the event position information for operating the user vehicle.

20 Claims, 5 Drawing Sheets

(56) References Cited

U.S. PATENT DOCUMENTS

| | | | | |
|---|---|---|---|---|
| 2010/0033313 A1* | 2/2010 | Keady | ............... | G08G 1/0965 |
| | | | | 340/438 |
| 2014/0062724 A1* | 3/2014 | Varoglu | ............... | G08G 1/163 |
| | | | | 340/902 |
| 2017/0249839 A1* | 8/2017 | Becker | ............ | G08G 1/096725 |
| 2018/0350391 A1* | 12/2018 | Moore | ............... | G10K 11/16 |

* cited by examiner

NAVIGATION SYSTEM WITH SONIC ANALYSIS MECHANISM AND METHOD OF OPERATION THEREOF

TECHNICAL FIELD

An embodiment of the present invention relates generally to a navigation system, and more particularly to a system for sonic detection.

BACKGROUND

Modern consumer and industrial electronics, especially devices such as graphical navigation systems, cellular phones, and vehicle integrated navigation and computing systems, are providing increasing levels of functionality to support modem life, including navigation and route guidance services. Research and development in the existing technologies can take a myriad of different directions.

As users become more empowered with the growth of navigation devices and vehicle based navigation services, new and old paradigms begin to take advantage of this new device space. There are many technological solutions to take advantage of this new device capability for autonomous vehicle operation. However, users are often not provided with enhanced auditory or sonic aspects of their surroundings when riding in a vehicle.

Thus, a need still remains for a navigation system with a sonic analysis mechanism for autonomous operation of a vehicle. In view of the ever-increasing commercial competitive pressures, along with growing consumer expectations and the diminishing opportunities for meaningful product differentiation in the marketplace, it is increasingly critical that answers be found to these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

SUMMARY

An embodiment of the present invention provides a navigation system, including: a communication unit configured to receive a vehicle external environment information of a user vehicle; and a control unit, coupled to the communication unit, configured to: identify a sonic event from the vehicle external environment information; calculate an event position information of the sonic event relative to the user vehicle; and generate a vehicle operation instruction based on the sonic event and the event position information for operating the user vehicle.

An embodiment of the present invention provides a method of operation of a navigation system including: receiving a vehicle external environment information of a user vehicle; identifying a sonic event from the vehicle external environment information; calculating an event position information of the sonic event relative to the user vehicle; and generating a vehicle operation instruction based on the sonic event and the event position information for operating the user vehicle.

An embodiment of the present invention provides a non-transitory computer readable medium including instructions executable by a control circuit for a navigation system, the instructions including: receiving a vehicle external environment information of a user vehicle; identifying a sonic event from the vehicle external environment information; calculating an event position information of the sonic event relative to the user vehicle; and generating a vehicle operation instruction based on the sonic event and the event position information for operating the user vehicle.

Certain embodiments of the invention have other steps or elements in addition to or in place of those mentioned above. The steps or elements will become apparent to those skilled in the art from a reading of the following detailed description when taken with reference to the accompanying drawings.

DETAILED DESCRIPTION

Figure 1:
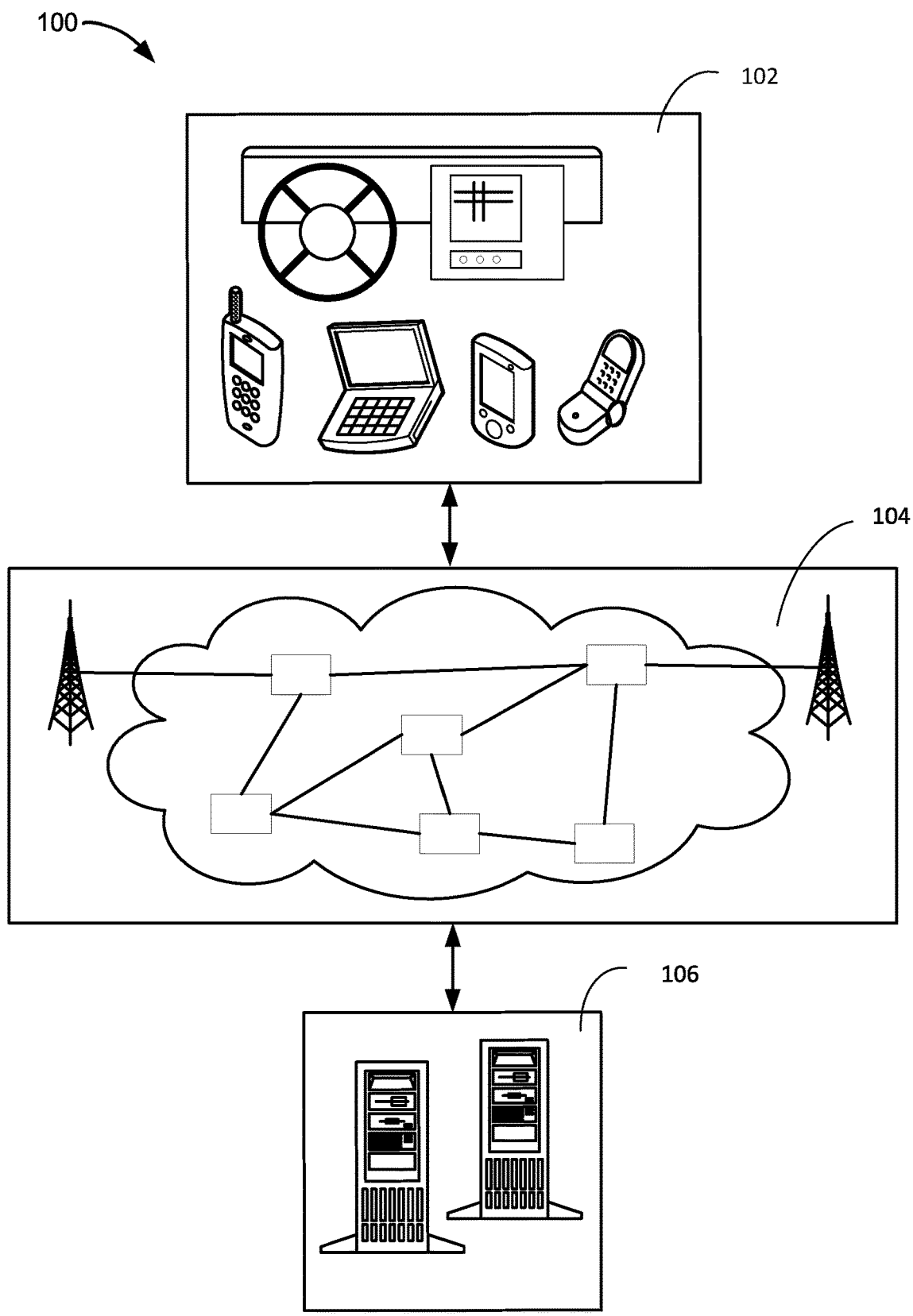
FIG. 1 is a navigation system with sonic analysis mechanism in an embodiment of the present invention.

The following embodiments are described in sufficient detail to enable those skilled in the art to make and use the invention. It is to be understood that other embodiments would be evident based on the present disclosure, and that system, process, or mechanical changes may be made without departing from the scope of an embodiment of the present invention.

In the following description, numerous specific details are given to provide a thorough understanding of the invention. However, it will be apparent that the invention may be practiced without these specific details. In order to avoid obscuring an embodiment of the present invention, some well-known circuits, system configurations, and process steps are not disclosed in detail.

The drawings showing embodiments of the system are semi-diagrammatic, and not to scale and, particularly, some of the dimensions are for the clarity of presentation and are shown exaggerated in the drawing figures. Similarly, although the views in the drawings for ease of description generally show similar orientations, this depiction in the figures is arbitrary for the most part. Generally, the invention can be operated in any orientation. The embodiments have been numbered first embodiment, second embodiment, etc. as a matter of descriptive convenience and are not intended to have any other significance or provide limitations for an embodiment of the present invention.

The term "module" referred to herein can include software, hardware, or a combination thereof in an embodiment of the present invention in accordance with the context in which the term is used. For example, the software can be machine code, firmware, embedded code, and application software. Also for example, the hardware can be circuitry, processor, computer, integrated circuit, integrated circuit cores, a pressure sensor, an inertial sensor, a microelectromechanical system (MEMS), passive devices, or a combination thereof. Further, if a module is written in the apparatus claims section below, the modules are deemed to include hardware circuitry for the purposes and the scope of apparatus claims.

The modules in the following description of the embodiments can be coupled to one other as described or as shown. The coupling can be direct or indirect without or with, respectively, intervening items between coupled items. The coupling can be physical contact or by communication between items.

Referring now to FIG. 1, therein is shown a navigation system 100 with sonic analysis mechanism in an embodiment of the present invention. The navigation system 100 includes a first device 102, such as a client or a server, connected to a second device 106, such as a client or server. The first device 102 can communicate with the second device 106 with a communication path 104, such as a wireless or wired network.

For example, the first device 102 can be of any of a variety of computing devices, such as a cellular phone, a tablet computer, a smart phone, a notebook computer, vehicle embedded navigation system, or computing device. The first device 102 can couple, either directly or indirectly, to the communication path 104 to communicate with the second device 106 or can be a stand-alone device.

The second device 106 can be any of a variety of centralized or decentralized computing devices, sensor devices to take measurements or record environmental information, such as sensor instruments, sensor equipment, or a sensor array. For example, the second device 106 can be a multimedia computer, a laptop computer, a desktop computer, grid-computing resources, a virtualized computer resource, cloud computing resource, routers, switches, peer-to-peer distributed computing devices, or a combination thereof.

The second device 106 can be mounted externally or internally to a vehicle, centralized in a single room or within a vehicle, distributed across different rooms, distributed across different geographical locations, embedded within a telecommunications network. The second device 106 can couple with the communication path 104 to communicate with the first device 102.

For illustrative purposes, the navigation system 100 is described with the second device 106 as a computing device, although it is understood that the second device 106 can be different types of devices, such as a standalone sensor or measurement device. Also for illustrative purposes, the navigation system 100 is shown with the second device 106 and the first device 102 as end points of the communication path 104, although it is understood that the navigation system 100 can have a different partition between the first device 102, the second device 106, and the communication path 104. For example, the first device 102, the second device 106, or a combination thereof can also function as part of the communication path 104.

The communication path 104 can span and represent a variety of networks and network topologies. For example, the communication path 104 can include wireless communication, wired communication, optical, ultrasonic, or the combination thereof. Satellite communication, cellular communication, Bluetooth, Infrared Data Association standard (IrDA), wireless fidelity (WiFi), and worldwide interoperability for microwave access (WiMAX) are examples of wireless communication that can be included in the communication path 104. Ethernet, digital subscriber line (DSL), fiber to the home (FTTH), and plain old telephone service (POTS) are examples of wired communication that can be included in the communication path 104. Further, the communication path 104 can traverse a number of network topologies and distances. For example, the communication path 104 can include direct connection, personal area network (PAN), local area network (LAN), metropolitan area network (MAN), wide area network (WAN), or a combination thereof.

Figure 2:
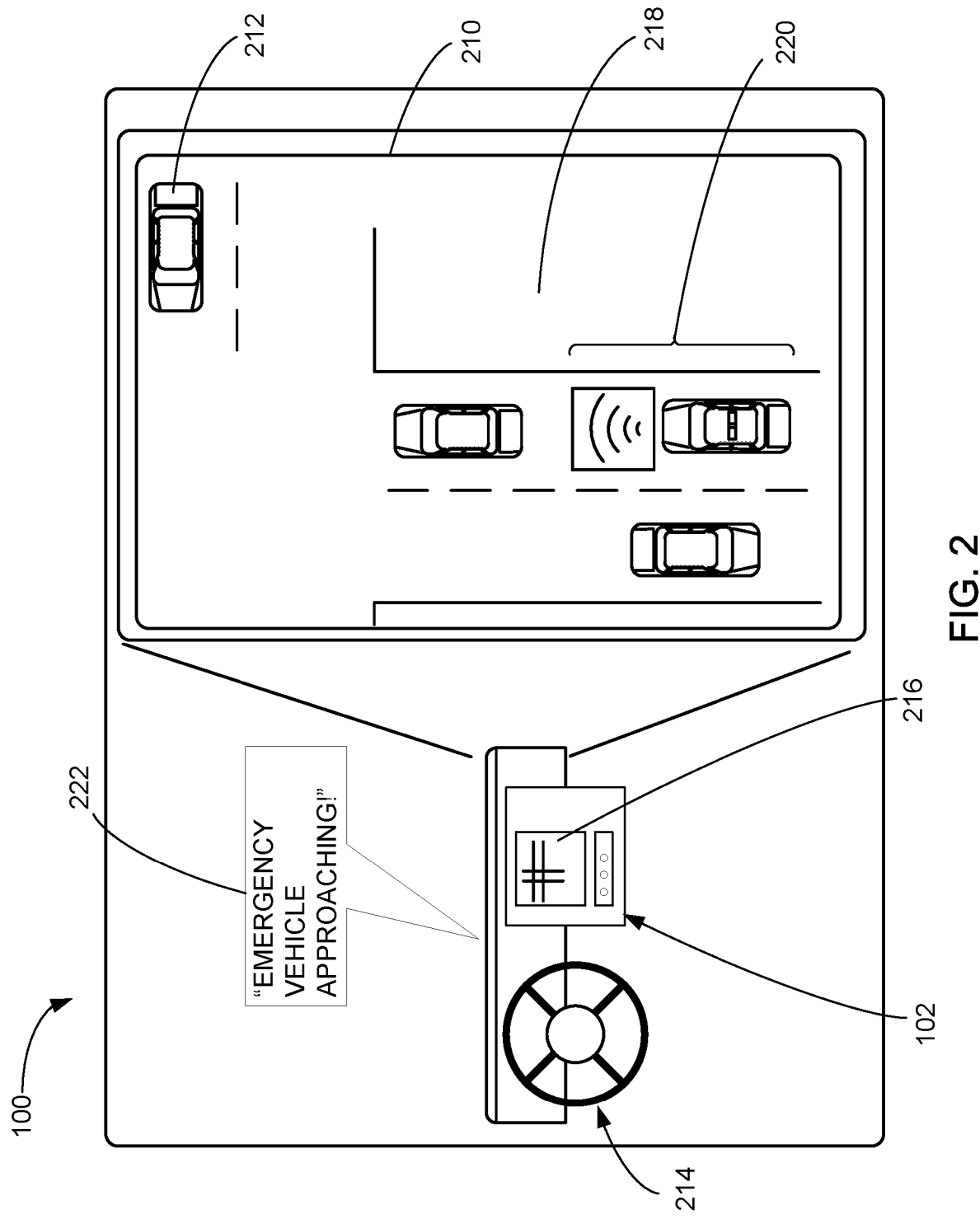
FIG. 2 is an example of a display interface of the first device of FIG. 1.

Referring now to FIG. 2, therein is shown an example of a display interface 210 of the first device 102 of FIG. 1. The display interface 210 can be part of an attached or embedded vehicle interface of a user vehicle 212, such as a dashboard or center console integrated display, a mobile or standalone device, such as a navigation device, mobile phone, or mobile computing device. The user vehicle 212 can be a vehicle occupied by the user (not shown) of the first device 102, such as the operator or driver of the user vehicle 212.

The navigation system 100 can include the capability for autonomous vehicle operation 214 of the user vehicle 212. The autonomous vehicle operation 214 is a mode of operation for the user vehicle 212 that performs various functions and operations for autonomous control and operation of the user vehicle 212. For example, during autonomous vehicle operation 214, the navigation system 100 can perform functions for autonomous driving of the user vehicle 212 and other related operations. As a specific example, the navigation system 100 can engage in the autonomous vehicle operation 214 of the user vehicle 212 through control and operation of essential vehicle control functions, non-essential vehicle functions, or a combination thereof.

The essential vehicle control functions are functions for driving the user vehicle 212. For example, the essential vehicle control functions can include braking control functions, steering control functions, throttling control functions, or a combination thereof.

The non-essential vehicle functions are functions related to or ancillary to driving of the user vehicle 212. More specifically, the non-essential vehicle functions can be functions or systems that do not control the essential vehicle control functions of user vehicle 212. For example, the non-essential vehicle functions can be supplemental safety systems or convenience systems. Examples of supplemental safety systems can include collision warning, lane departure warning, blind spot monitoring. Examples of convenience systems can include automated controls for wipers, headlights, turn signals, or hazard lights.

The navigation system 100 can engage in the autonomous vehicle operation 214 by generating vehicle operation instructions 216 to control the essential vehicle control functions, the non-essential vehicle functions, or a combination thereof. For example, the vehicle operation instructions 216 can be commands to manipulate mechanical and electronic systems associated with the essential vehicle control functions in the user vehicle 212 in order to execute driving maneuvers, such as distance control, speed control, acceleration, braking, or turning.

The navigation system 100 can generate the vehicle operation instructions 216 for the autonomous vehicle operation 214 based on a number of factors. As an example, one factor of the many factors can include generation of the vehicle operation instructions 216 based on a vehicle external environment information 218.

The vehicle external environment information 218 is information regarding objects, conditions, circumstances, or a combination thereof surrounding the user vehicle 212. For example, the vehicle external environment information 218 can include information about stationary objects, such as road fixtures, signs, trees, or buildings. In another example, the vehicle external environment information 218 can include information about moving objects, such as vehicles, animals, and pedestrians. In a further example, the vehicle external environment information 218 can include information about conditions and circumstances around the user vehicle 212, including weather, events, traffic conditions, or road conditions.

The vehicle external environment information 218 can include information about a sonic event 220. The sonic event 220 is an event or occurrence that emits soundwaves or sonic vibrations, which are compressions and rarefactions in an elastic medium, such as air or water, by which sound is propagated. The soundwaves or sonic vibrations can be in a frequency range that is within human hearing or beyond the range of human hearing or inaudible by humans. In general, the human hearing frequency range can between 12 hertz (Hz) to 20,000 Hz and at a lower volume threshold of down to zero decibels to an upper threshold of 140 decibels, although it is understood that the frequency and decibel range can be greater or smaller based on the individual. Examples of the sonic event 220 can include sounds from: vehicles sharing the same travel channel as the user vehicle 212 or a different travel channel as the user vehicle 212; road or traffic control infrastructure; emergency response situations; construction or landscaping; the presence of people or animals; or weather.

The travel channel refers to the mode of transportation for vehicles, such as roads, rails, water ways, or air ways. Examples of the sonic events 220 for travel channels that are the same as the travel channel of the user vehicle 212 can includes sounds emitted from other vehicles, such as: another vehicle honking, music from an ice cream truck, motorcycle engines, tractor-trailer engines, music from nearby cars, snowplows, street sweepers, buses, and the beeping sound made by trucks when reversing. Examples of the sonic events 220 for the travel channels that are different from the travel channel of the user vehicle 212 can include sounds emitted from: train engines, monorails, cable cars, light rail trains, boats, helicopters, or airplanes.

Examples of the sonic events 220 for road or traffic control infrastructure can include sounds such as: beeps and dings from traffic signals, such as the sounds made to assist visually impaired individuals or clicks made by mechanical or electric systems inside the traffic signals during the change of lights, or railroad crossing bells. Examples of the sonic events 220 for construction or landscaping can include sounds emitted from: jackhammers, pile drivers, excavator, nail guns, pneumatic drills, chainsaws, wood chippers, hedge trimmers, or lawnmowers. Examples of the sonic events 220 for emergency response situations can include sounds such as: police sirens, fire truck sirens, ambulance sirens, tsunami warnings, or air raid sirens.

Examples of the sonic events 220 associated with people and pedestrians can include sounds associated with: footsteps, bicycle bells, clicking from wheels, music from personal stereos, balls bouncing on the sidewalk, sound of a baseball hitting a bat, sound of a ball being kicked, laughter, sneezing, live music, the sound of a school bell or indicating the starting or ending of classes at a school, fire alarms from buildings, announcements from police officers directing traffic, large crowds leaving athletic competitions, street music; cathedral bells, chanting or calls to prayer. Examples of the sonic events 220 associated with animals can include sounds such as: barking dogs, the clopping of horse hoofs, or ringing of cowbells.

Examples of the sonic events 220 associated with weather can include sounds such as hail or rain striking the vehicle or the roadway, blowing of wind, or the clap of thunder. Examples of the sonic events 220 associated with road conditions can include the sounds of crunching or grinding of rocks when driving over gravel, splashing of water when driving through water or mud, or slushing when driving through snow.

The sonic events 220 with soundwaves that are beyond the range of human hearing can include vibrations emitted at frequencies above or below that of human hearing. For example, the sonic events 220 can include vibrations from rumble strips between the edge of the road and the shoulder of the road; vibration from the road surface indicating a gravel surface, absence of vibration indicating ice on the roadway, vibrations from heavy trucks, or the rumble of a freight train. The sonic events 220 can also include vibrations or changes in pressure from the P-wave preceding an earthquake.

The navigation system 100 can generate the vehicle operation instructions 216 to account for the sonic events 220. For example, for the sonic event 220 of construction sounds, the navigation system 100 can generate the vehicle operation instructions 216 to find an alternate route to avoid the construction. In another example, for the sonic event 220 of emergency sounds, such as an approaching emergency vehicle, the navigation system 100 can generate the vehicle operation instructions 216 to reduce the speed of the user vehicle 212 and move towards the side of the road. In a further example, for the sonic event 220 of road conditions with heavy vibration, the navigation system 100 can generate the vehicle operation instructions 216 to reduce the speed of the user vehicle 212 to be consistent with the decreased performance expected on a bumpy road. In yet a further example, for the sonic event 220 of the presence of pedestrians or animals, the navigation system 100 can generate the vehicle operation instructions 216 to prepare for sudden stops due to animal or pedestrian crossings into the road way. In yet a further example, for the sonic event 220 of vibrations from the P-wave preceding the S-wave, which is generally the slower and more destructive, of an earthquake; in this case can be used to get the vehicle to move itself to a safe location if time permits, or to avoid going onto a bridge during the time before the arrival of the S-wave. Details on identifying of sonic event 220 and generating vehicle operation instructions 216 based on the sonic event 200 will be described below.

Optionally, the navigation system 100 can generate the vehicles operation instructions 216 to notify the vehicle occupant (not shown) of the sonic event 220 through an operation alert 222. For example, the navigation system 100 can generate the operation alert 222 to include audio cues or messages, visual cues or messages, haptic cues, or a combination thereof. As a specific example, the navigation system 100 can present the sonic event 200 on the display interface 210, such as the location of an approaching emergency vehicle on a map. As another specific example, the navigation system 100 can generate the operation alert 222 to play the sound of the ambulance or an announcement stating "emergency vehicle detected, slowing down now" into an otherwise quiet vehicle cabin in order to give the vehicle occupant an audio cue as to why the user vehicle 212 was pulling over.

Figure 3:
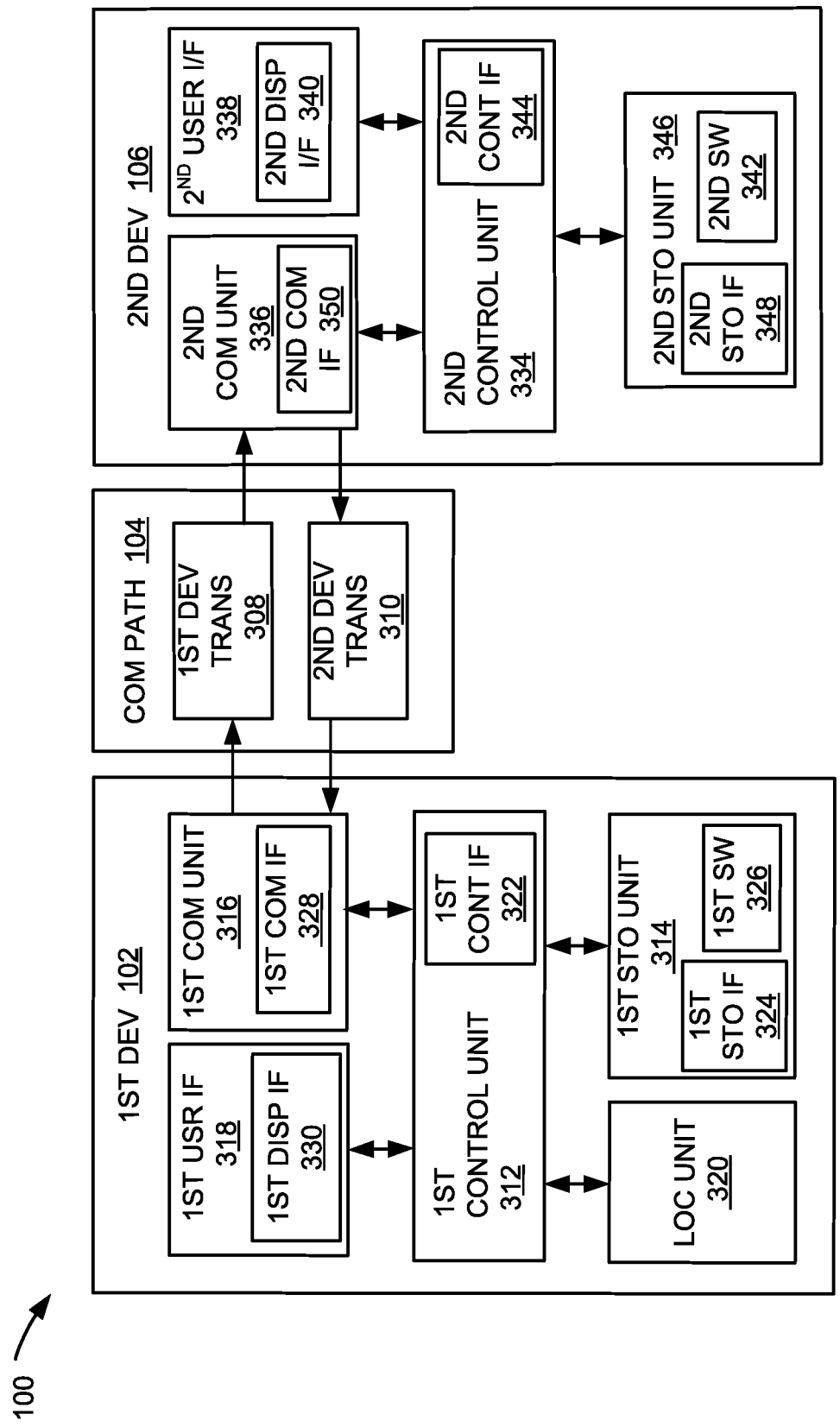
FIG. 3 is an exemplary block diagram of the navigation system.

Referring now to FIG. 3, therein is shown an exemplary block diagram of the navigation system 100. The navigation system 100 can include the first device 102, the communication path 104, and the second device 106. The first device 102 can send information in a first device transmission 308 over the communication path 104 to the second device 106. The second device 106 can send information in a second device transmission 310 over the communication path 104 to the first device 102.

For illustrative purposes, the navigation system 100 is shown with the first device 102 as a client device, although it is understood that the navigation system 100 can have the first device 102 as a different type of device. For example, the first device 102 can be a server having a display interface.

Also for illustrative purposes, the navigation system 100 is shown with the second device 106 as a server, although it is understood that the navigation system 100 can have the second device 106 as a different type of device. For example, the second device 106 can be a client device.

For brevity of description in this embodiment of the present invention, the first device 102 will be described as a client device and the second device 106 will be described as a server device. The embodiment of the present invention is not limited to this selection for the type of devices. The selection is an example of an embodiment of the present invention.

The first device 102 can include a first control unit 312, a first storage unit 314, a first communication unit 316, and a first user interface 318. The first control unit 312 can include a first control interface 322. The first control unit 312 can execute a first software 326 to provide the intelligence of the navigation system 100.

The first control unit 312 can be implemented in a number of different manners. For example, the first control unit 312 can be a processor, an application specific integrated circuit (ASIC) an embedded processor, a microprocessor, a hardware control logic, a hardware finite state machine (FSM), a digital signal processor (DSP), or a combination thereof. The first control interface 322 can be used for communication between the first control unit 312 and other functional units in the first device 102. The first control interface 322 can also be used for communication that is external to the first device 102.

The first control interface 322 can receive information from the other functional units or from external sources, or can transmit information to the other functional units or to external destinations. The external sources and the external destinations refer to sources and destinations external to the first device 102.

The first control interface 322 can be implemented in different ways and can include different implementations depending on which functional units or external units are being interfaced with the first control interface 322. For example, the first control interface 322 can be implemented with a pressure sensor, an inertial sensor, a microelectromechanical system (MEMS), optical circuitry, waveguides, wireless circuitry, wireline circuitry, or a combination thereof.

The first storage unit 314 can store the first software 326. The first storage unit 314 can also store the relevant information. For example, first storage unit 314 information for generating the interface map 218 of FIG. 2

The first storage unit 314 can be a volatile memory, a nonvolatile memory, an internal memory, an external memory, or a combination thereof. For example, the first storage unit 314 can be a nonvolatile storage such as non-volatile random access memory (NVRAM), Flash memory, disk storage, or a volatile storage such as static random access memory (SRAM).

The first storage unit 314 can include a first storage interface 324. The first storage interface 324 can be used for communication between and other functional units in the first device 102. The first storage interface 324 can also be used for communication that is external to the first device 102.

The first storage interface 324 can receive information from the other functional units or from external sources, or can transmit information to the other functional units or to external destinations. The external sources and the external destinations refer to sources and destinations external to the first device 102.

The first storage interface 324 can include different implementations depending on which functional units or external units are being interfaced with the first storage unit 314. The first storage interface 324 can be implemented with technologies and techniques similar to the implementation of the first control interface 322.

The first communication unit 316 can enable external communication to and from the first device 102. For example, the first communication unit 316 can permit the first device 102 to communicate with the second device 106 of FIG. 1, an attachment, such as a peripheral device or a computer desktop, and the communication path 104.

The first communication unit 316 can also function as a communication hub allowing the first device 102 to function as part of the communication path 104 and not limited to be an end point or terminal unit to the communication path 104. The first communication unit 316 can include active and passive components, such as microelectronics or an antenna, for interaction with the communication path 104.

The first communication unit 316 can include a first communication interface 328. The first communication interface 328 can be used for communication between the first communication unit 316 and other functional units in the first device 102. The first communication interface 328 can receive information from the other functional units or can transmit information to the other functional units.

The first communication interface 328 can include different implementations depending on which functional units are being interfaced with the first communication unit 316. The first communication interface 328 can be implemented with technologies and techniques similar to the implementation of the first control interface 322.

The first user interface 318 allows a user (not shown) to interface and interact with the first device 102. The first user interface 318 can include an input device and an output device. Examples of the input device of the first user interface 318 can include a keypad, a touchpad, soft-keys, a keyboard, a microphone, an infrared sensor for receiving remote signals, or any combination thereof to provide data and communication inputs.

The first user interface 318 can include a first display interface 330. The first display interface 330 can include a display, a projector, a video screen, a speaker, or any combination thereof.

The first control unit 312 can operate the first user interface 318 to display information generated by the navigation system 100. The first control unit 312 can also execute the first software 326 for the other functions of the navigation system 100. The first control unit 312 can further execute the first software 326 for interaction with the communication path 104 via the first communication unit 316.

The second device 106 can be optimized for implementing an embodiment of the present invention in a multiple device embodiment with the first device 102. The second device 106 can provide the additional or higher performance processing power compared to the first device 102. The second device 106 can include a second control unit 334, a second communication unit 336, and a second user interface 338.

The second user interface 338 allows a user (not shown) to interface and interact with the second device 106. The second user interface 338 can include an input device and an output device. Examples of the input device of the second user interface 338 can include a keypad, a touchpad, softkeys, a keyboard, a microphone, or any combination thereof to provide data and communication inputs. Examples of the output device of the second user interface 338 can include a second display interface 340. The second display interface 340 can include a display, a projector, a video screen, a speaker, or any combination thereof.

The second control unit 334 can execute a second software 342 to provide the intelligence of the second device 106 of the navigation system 100. The second software 342 can operate in conjunction with the first software 326. The second control unit 334 can provide additional performance compared to the first control unit 312.

The second control unit 334 can operate the second user interface 338 to display information. The second control unit 334 can also execute the second software 342 for the other functions of the navigation system 100, including operating the second communication unit 336 to communicate with the first device 102 over the communication path 104.

The second control unit 334 can be implemented in a number of different manners. For example, the second control unit 334 can be a processor, an embedded processor, a microprocessor, hardware control logic, a hardware finite state machine (FSM), a digital signal processor (DSP), or a combination thereof.

The second control unit 334 can include a second controller interface 344. The second controller interface 344 can be used for communication between the second control unit 334 and other functional units in the second device 106. The second controller interface 344 can also be used for communication that is external to the second device 106.

The second controller interface 344 can receive information from the other functional units or from external sources, or can transmit information to the other functional units or to external destinations. The external sources and the external destinations refer to sources and destinations external to the second device 106.

The second controller interface 344 can be implemented in different ways and can include different implementations depending on which functional units or external units are being interfaced with the second controller interface 344. For example, the second controller interface 344 can be implemented with a pressure sensor, an inertial sensor, a microelectromechanical system (MEMS), optical circuitry, waveguides, wireless circuitry, wireline circuitry, or a combination thereof.

A second storage unit 346 can store the second software 342. The second storage unit 346 can also store the information for generating the interface map 218 of FIG. 2. The second storage unit 346 can be sized to provide the additional storage capacity to supplement the first storage unit 314.

For illustrative purposes, the second storage unit 346 is shown as a single element, although it is understood that the second storage unit 346 can be a distribution of storage elements. Also for illustrative purposes, the navigation system 100 is shown with the second storage unit 346 as a single hierarchy storage system, although it is understood that the navigation system 100 can have the second storage unit 346 in a different configuration. For example, the second storage unit 346 can be formed with different storage technologies forming a memory hierarchal system including different levels of caching, main memory, rotating media, or off-line storage.

The second storage unit 346 can be a volatile memory, a nonvolatile memory, an internal memory, an external memory, or a combination thereof. For example, the second storage unit 346 can be a nonvolatile storage such as non-volatile random access memory (NVRAM), Flash memory, disk storage, or a volatile storage such as static random access memory (SRAM).

The second storage unit 346 can include a second storage interface 348. The second storage interface 348 can be used for communication between other functional units in the second device 106. The second storage interface 348 can also be used for communication that is external to the second device 106.

The second storage interface 348 can receive information from the other functional units or from external sources, or can transmit information to the other functional units or to external destinations. The external sources and the external destinations refer to sources and destinations external to the second device 106.

The second storage interface 348 can include different implementations depending on which functional units or external units are being interfaced with the second storage unit 346. The second storage interface 348 can be implemented with technologies and techniques similar to the implementation of the second controller interface 344.

The second communication unit 336 can enable external communication to and from the second device 106. For example, the second communication unit 336 can permit the second device 106 to communicate with the first device 102 over the communication path 104.

The second communication unit 336 can also function as a communication hub allowing the second device 106 to function as part of the communication path 104 and not limited to be an end point or terminal unit to the communication path 104. The second communication unit 336 can include active and passive components, such as microelectronics or an antenna, for interaction with the communication path 104.

The second communication unit 336 can include a second communication interface 350. The second communication interface 350 can be used for communication between the second communication unit 336 and other functional units in the second device 106. The second communication interface 350 can receive information from the other functional units or can transmit information to the other functional units.

The second communication interface 350 can include different implementations depending on which functional units are being interfaced with the second communication unit 336. The second communication interface 350 can be implemented with technologies and techniques similar to the implementation of the second controller interface 344.

The first communication unit 316 can couple with the communication path 104 to send information to the second device 106 in the first device transmission 308. The second device 106 can receive information in the second communication unit 336 from the first device transmission 308 of the communication path 104.

The second communication unit 336 can couple with the communication path 104 to send information to the first device 102 in the second device transmission 310. The first device 102 can receive information in the first communication unit 316 from the second device transmission 310 of the communication path 104. The navigation system 100 can be executed by the first control unit 312, the second control unit 334, or a combination thereof. For illustrative purposes, the second device 106 is shown with the partition having the second user interface 338, the second storage unit 346, the second control unit 334, and the second communication unit 336, although it is understood that the second device 106 can have a different partition. For example, the second software 342 can be partitioned differently such that some or all of its function can be in the second control unit 334 and the second communication unit 336. Also, the second device 106 can include other functional units not shown in FIG. 3 for clarity.

The functional units in the first device 102 can work individually and independently of the other functional units. The first device 102 can work individually and independently from the second device 106 and the communication path 104.

The functional units in the second device 106 can work individually and independently of the other functional units. The second device 106 can work individually and independently from the first device 102 and the communication path 104.

For illustrative purposes, the navigation system 100 is described by operation of the first device 102 and the second device 106. It is understood that the first device 102 and the second device 106 can operate any of the modules and functions of the navigation system 100.

Figure 4:
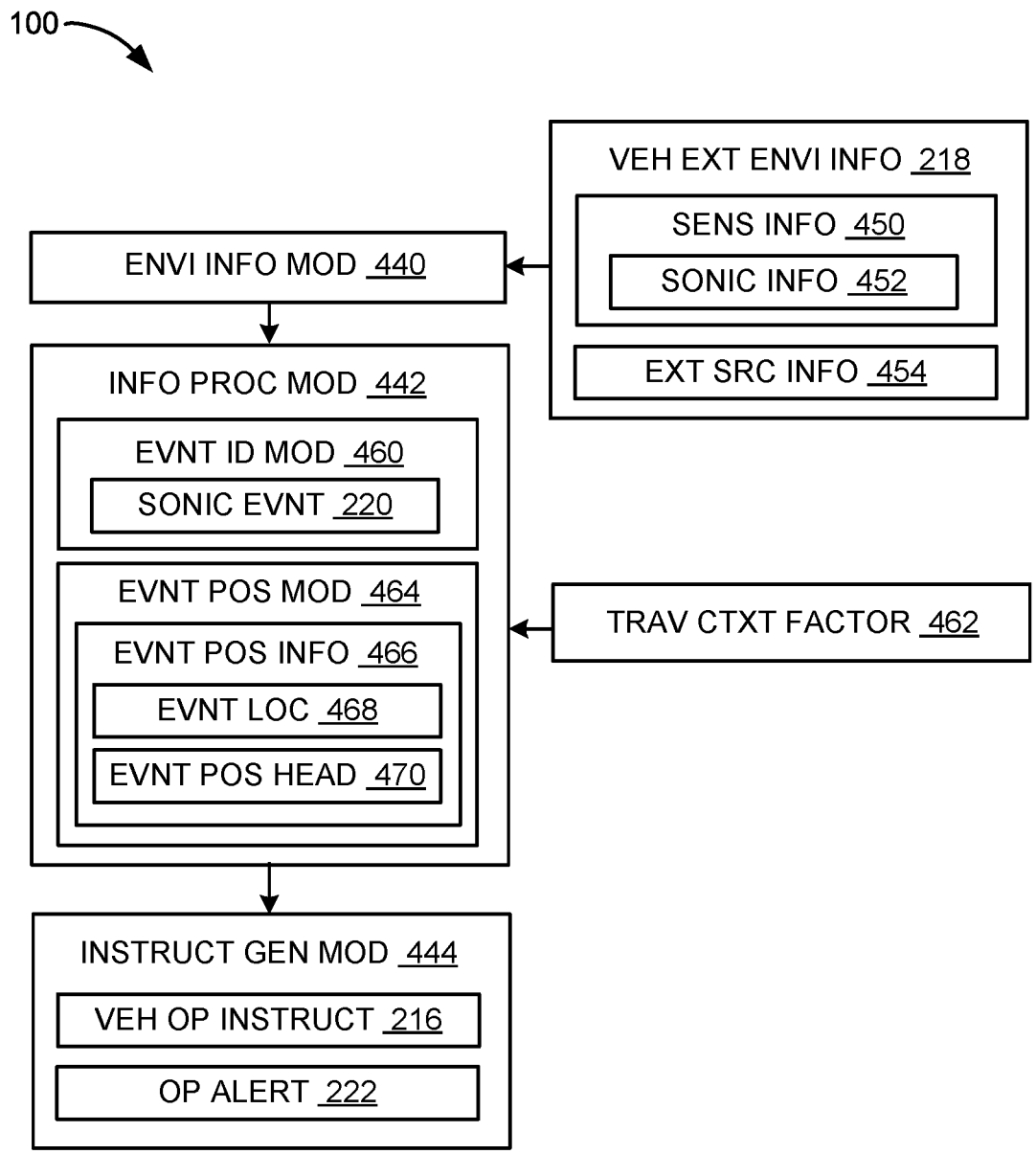
FIG. 4 is a control flow of the navigation system.

Referring now to FIG. 4, therein is shown a control flow of the navigation system 100. The navigation system 100 can include an environment information module 440, an information processing module 442, and an instruction generation module 444. The information processing module 442 can be coupled to the environment information module 440. The instruction generation module 444 is coupled to the information processing module 442.

The environment information module 440 is for receiving the vehicle external environment information 218 of the user vehicle 212. The environment information module 440 can receive the vehicle external environment information 218 in a number of different ways. For example, the environment information module 412 can interface with the communication unit 316 of FIG. 3 to interface with various devices or systems external to the first device 102 to receive the external environmental information 218.

In one implementation, the environment information module 412 can receive the vehicle external environment information 218 as sensor information 450. For example, the environment information module 412 can collect the vehicle external environment information 218 by sending commands or requests to a sensor unit to take various readings or measurements, which can be transmitted back to the environment information module 412 as the sensor information 450.

The sensor unit can be a device that includes sensors and detection instruments. For example, the sensor unit can include one or more instruments or sensors, such as a camera, a microphone, an infrared detector, a radar detector, a LIDAR unit, a vibration sensor using piezoelectric material, or a combination thereof. The sensor unit can include instruments and sensors attached to or integrated with the user vehicle 212, external to the user vehicle 212, such as sensors or instruments mounted on the side of the road, can be a part of or coupled to the first device 102, the second device 106, or a combination thereof.

The sensor information 450 can be information recorded or measured by sensors or instruments, such as the sensor unit, for the area or environment surrounding the user vehicle 212. The sensor information 450 for the vehicle external environment information 218 can include various types of information regarding objects surrounding the user vehicle 212 and can be provided in a number of different formats and states. The format of the vehicle external environment information 218 can be based on the source of the vehicle external environment information 218. For example, the state of the vehicle external environment information 218 can be raw or unprocessed information, such as raw signals or images, partially processed information, or processed information. More specifically, the sensor information 450 can be raw or unprocessed information or partially processed information sensor readings measured or recorded by the sensor unit.

As a specific example, the sensor information 450 can include sonic information 452. Sonic information 452 is information related to sounds and vibrations around the user vehicle 212. For example, the sonic information 452 can be the soundwaves, pressure waves, sound vibrations, or a combination thereof associated with the vehicle external environment information 218. The sonic information 452 can be can be digital or analog signals representing captured or recorded pressure waves, soundwaves, sound vibrations, or a combination thereof. More specifically, the sonic information 452 can include properties of the soundwaves or sound vibrations, such as frequency, intensity, amplitude, or a combination thereof. The sonic information 452 can include soundwaves or sound vibrations that are at frequencies of sound within the range of human hearing or outside the range of human hearing. As an example, the environment information module 440 can receive the sonic information from sensor units, such as microphones or vibration sensors.

In another implementation, the environment information module 440 can receive the vehicle external environment information 218 as external source information 454. For example, the external source information 454 can include the sonic information 452 received through communication or interfacing with other vehicles; information accumulated from sensors or detection instruments at a fixed location, such as mounted to buildings or stationary objects; a computer server or network; or a combination thereof. As a specific example of sonic information 452 received from sensors or detection instruments mounted to buildings or stationary objects, the sonic information 452 can be captured or recorded by sensors, such as a microphone, mounted near the roadway, which can be received by the first communication unit 316. In another specific example, receiving the external source information 454 from other vehicles when the sensor units of the user vehicle 212 or the first device 102 are out of range to detect can the sonic information 452. The first control unit 312 can implement the first communication unit 316 with the environment information module 440 to communicate with devices external to the first device 102, such communication units of surrounding vehicles or a traffic server.

It has been discovered that receiving the external source information 454, including sonic information 452, from the sensors unit at a fixed location improves the quality of sonic information 452 received by the navigation system 100. The sonic information 452 collected at the fixed location is not obstructed by background noise and the sounds generated by the user vehicle 212, such as engine noise. Thus, navigation system 100 receives the sonic information 452 with improved quality by reducing background noise.

Receiving the vehicle external environment information 218 with the environment information module 440 has been described as separate implementations for the sake of clarity. However, it is understood that the environment information module 440 can use a combination of the implementations to gather or receive the vehicle external environment information 218.

The control flow can pass from the environment information module 440 to the information processing module 442. The information processing module 442 is for processing the vehicle external environment information 218 of the user vehicle 212. For example, the information processing module 442 can process the vehicle external environment information 218 to identify the sonic event 222.

The information processing module 442 can identify the sonic event 222 in a number of different ways. For example, the information processing module 442 can process the sonic information 452 of the sensor information 450 associated with the vehicle external environment information 218 with an event identification module 460. In an implementation of the navigation system 100, the event identification module 460 can analyze the sonic information 452 to identify different types of sounds that are present in the sonic information 452. For example, the event identification module 460 can compare and match the soundwaves of the sonic information 452 to known sound patterns or recorded sounds corresponding to different types of the sonic events 220. In another example, the sonic information 452 can be input into a sound recognition model built using machine learning techniques.

In another implementation, the event identification module 460, can identify the sonic events 220 based on a combination of multiple types of the sensor information 450, multiple sources of the sensor information 450, or a combination thereof. For example, analysis of the sonic information 452 can be combine with other instances of the sensor information 450, such as visual information from a camera. For instances, flashing lights and the sonic information 452 of a siren can be combine to identify the sonic event 222 of an approaching emergency vehicle. As another example, the sonic information 452 can be combine with the sensor information 450 from an infrared camera or sensor. As a specific example, the heat signature from a vehicle engine in addition to the sonic information 452 for the sound of a revving vehicle engine can identify the sonic event 222 of a vehicle that is preparing to move.

The event identification module 460 can incorporate travel context factors 462 in identifying the sonic event 222. The travel context factors 462 are information related to travel while operating the user vehicle 212. Examples of the travel context factors 462 can include a location context, such as the current location of the user vehicle 212; a temporal context, such as time of day, day of the week, or the current season; or a condition context, such as weather or events occurring along a travel path of the user vehicle 212. In an example of incorporating the travel context factors 462 in identifying the sonic event 222, for a situation where the travel context factors 462 include a location context of the user vehicle 212 located in a parking garage, the presence of engine noise or an increase in engine noise can indicate that a vehicle may be about to move from one of the parking spaces.

The information processing module 442 can calculate an event position information 466 for the sonic event with an event position module 464. The event position information 466 is information associated with the location of the sonic event 222. For example, the event position information 466 can include an event location 468, which is an estimate of the location of the sonic event 222 relative to the user vehicle 212. In another example, in the situation where the sonic event 222 includes a change in the event location 468, the event position information 466 can include an event position heading 470, which is an estimate of the direction of movement, the speed of movement, or a combination thereof for sonic event 222.

The event position module 464 can calculate the event location 468, the event position heading 470, or a combination thereof in a number of different ways. For example, the event position module 464 can calculate the event location 468 and the event position heading 470 based on the sonic information 452. As a specific example, the event position module 464 can calculate the event location 468 received from the sensor information 450 or the fixed external sensors of the external source information 454 to calculate the event location 468. For instance event position module 464 can calculate the event location 468 based on the differences between the intensities of the sonic information 452 received from multiple instances of the sensor units located at different positions around the user vehicle or at different fixed locations, which in effect, can triangulate an estimate for the event location 468.

In another specific example, the event position module 464 can calculate the event position heading 470 based on changes in the sonic information 452 over time. In one implementation, the event position module 464 can calculate the event position heading 470 based on the changes in the intensity of the soundwaves. For example, an increase in the intensity over a period of time can indicate that the event position heading 470 is approaching the user vehicle 212 while a decrease of the intensity over time can indicate the event position heading 470 as moving away from the user vehicle 212. In another implementation, the event position module 464 can calculate the event position heading 470 based on the Doppler shift associated with the sonic information 452. For example, an increase in the frequency can indicate that the event position heading 470 as approaching the user vehicle 212 while a reduction in the frequency can indicate the event position heading 470 as moving away from the user vehicle 212.

It has been discovered that the navigation system 100 that provides the event position information 466 provides improved identification and awareness of potential obstacles. During operation of the user vehicle 212, the navigation system 100 can provide the event location 468, the event position heading 470, or a combination thereof even though the sonic event 222 is not visible or is obscured, thereby improving identification and awareness of potential obstacles.

The control flow can pass from the information processing module 442 to the instruction generation module 444. The instruction generation module 444 is for generating the vehicle operation instructions 216. The instruction generation module 444 can generate the vehicle operation instructions 216 based on the sonic event 222, the event position information 466, or a combination thereof to operate the user vehicle 212.

For example, the instruction generation module 444 can generate the vehicle operation instructions 216 as instructions to control the essential vehicle control functions, such as braking control functions, steering control functions, throttling control functions, or a combination thereof. As a specific example, for the sonic event 220 of construction sounds, instruction generation module 442 can generate the vehicle operation instructions 216 to find an alternate route to avoid the construction. In another example, for the sonic event 220 of emergency sounds, such as an approaching emergency vehicle, the instruction generation module 442 can generate the vehicle operation instructions 216 to control the vehicle throttle, braking, and steering to reduce the speed of the user vehicle 212 and move towards the side of the road. In a further example, for the sonic event 220 of road conditions with heavy vibration, the instruction generation module 442 can generate the vehicle operation instructions 216 for controlling the vehicle throttle and brakes to reduce the speed of the user vehicle 212 to be consistent with the decreased performance or discomfort to the vehicle occupant expected while driving on a bumpy road. In yet a further example, for the sonic event 220 corresponding to the presence of pedestrians or animals, the instruction generation module 442 can generate the vehicle operation instructions 216 to prepare for sudden stops due to animal or pedestrian crossings into the road way. In yet a further example, for the sonic event 220 of vibrations from the P-wave preceding the S-wave, which is generally the slower and more destructive, of an earthquake; in this case can be used to get the vehicle to move itself to a safe location if time permits, or to avoid going onto a bridge during the time before the arrival of the S-wave.

Optionally, the instruction generation module 444 can generate the operation alert 222. For example, the instruction generation module 444 can generate the operation alert 222 to include audio cues or messages, visual cues or messages, haptic cues, or a combination thereof that can be presented to the vehicle occupant through first user interface 318 of FIG. 3. As a specific example, the instruction generation module 444 can generate the sonic event 200 as a visual alert such as the location of an approaching emergency vehicle on a map for presenting on the display interface 210. As another specific example, the instruction generation module 444 can generate the operation alert 222 as an audio alert including the sound of the ambulance or an announcement stating "emergency vehicle detected, slowing down now" into an otherwise quiet vehicle cabin in order to give the vehicle occupant an audio cue as to why the user vehicle 212 was pulling over. The above specific examples describe the operation alert 222 through a single type of cue, however, it is understood that a combination of cues can be use generate the operation alert 222.

The navigation system 100 has been described with module functions or order as an example. The navigation system 100 can partition the modules differently or order the modules differently. For example, the environment information module 440 can be coupled to the instruction generation module 444.

For illustrative purposes, the various modules have been described as being specific to the first device 102 or the second device 106. However, it is understood that the modules can be distributed differently. For example, the various modules can be implemented in a different device, or the functionalities of the modules can be distributed across multiple devices. Also as an example, the various modules can be stored in a non-transitory memory medium.

As a more specific example, one or more modules described above can be stored in the non-transitory memory medium for distribution to a different system, a different device, a different user, or a combination thereof, for manufacturing, or a combination thereof. Also as a more specific example, the modules described above can be implemented or stored using a single hardware unit, such as a chip or a processor, or across multiple hardware units.

The modules described in this application can be hardware implementation or hardware accelerators in the first control unit 316 of FIG. 3 or in the second control unit 338 of FIG. 3. The modules can also be hardware implementation or hardware accelerators within the first device 102 or the second device 106 but outside of the first control unit 316 or the second control unit 338, respectively, as depicted in FIG. 3. However, it is understood that the first control unit 316, the second control unit 338, or a combination thereof can collectively refer to all hardware accelerators for the modules.

The modules described in this application can be implemented as instructions stored on a non-transitory computer readable medium to be executed by a first control unit 312, the second control unit 336, or a combination thereof. The non-transitory computer medium can include the first storage unit 314 of FIG. 3, the second storage unit 346 of FIG. 3, or a combination thereof. The non-transitory computer readable medium can include non-volatile memory, such as a hard disk drive, non-volatile random access memory (NVRAM), solid-state storage device (SSD), compact disk (CD), digital video disk (DVD), or universal serial bus (USB) flash memory devices. The non-transitory computer readable medium can be integrated as a part of the navigation system 100 or installed as a removable portion of the navigation system 100.

Figure 5:
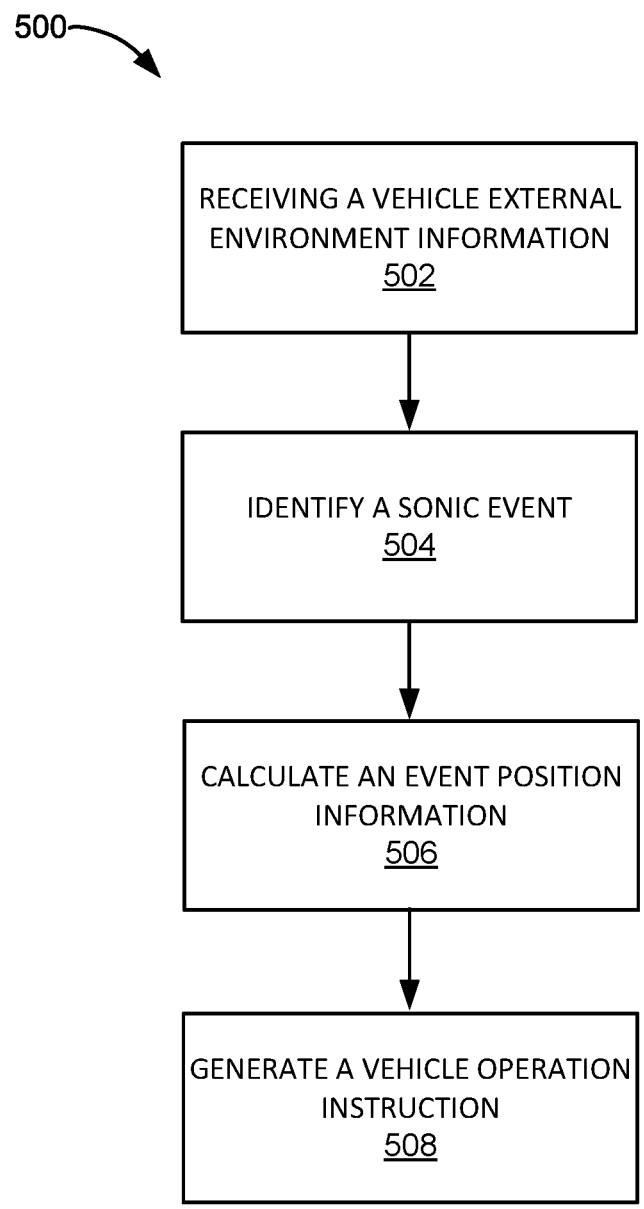
FIG. 5 is a flow chart of a method of operation of a navigation system in an embodiment of the present invention.

Referring now to FIG. 5, therein is shown a flow chart of a method 500 of operation of a navigation system 100 in an embodiment of the present invention. The method 500 includes: receiving a vehicle external environment information of a user vehicle in a block 502; identifying a sonic event from the vehicle external environment information in a block 504; calculating an event position information of the sonic event relative to the user vehicle in a block 506; and generating a vehicle operation instruction based on the sonic event and the event position information for operating the user vehicle in a block 508.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of an embodiment of the present invention is that it valuably supports and services the historical trend of reducing costs, simplifying systems, and increasing performance.

These and other valuable aspects of an embodiment of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters set forth herein or shown in the accompanying drawings are to be interpreted in an illustrative and non-limiting sense.

What is claimed is:

1. A navigation system comprising:
a communication unit configured to receive a vehicle external environment information of a user vehicle; and
a control unit, coupled to the communication unit, configured to:
identify a sonic event from the vehicle external environment information, wherein the sonic event includes sounds associated with a sound of a road based on weather and a road condition, including sound crunching on the road, for the user vehicle;
calculate an event position information of the sonic event relative to the user vehicle; and generate a vehicle operation instruction for the autonomous vehicle operation and for an alternate route to avoid the sonic event and the event position information for the sound about the road for operating the user vehicle.

2. The system as claimed in claim 1 wherein the control unit is configured to identify the sonic event based on a travel context factor.

3. The system as claimed in claim 1 wherein:
the communication unit configured to receive the vehicle external environment information as sensor information, including the sonic information, from a sensor unit of the user vehicle; and
the control unit is configured to identify the sonic event based on the sonic information.

4. The system as claimed in claim 1 wherein:
the communication unit configured to receive the vehicle external environment information as an external source information; and
the control unit is configured to identify the sonic event based on the external source information.

5. The system as claimed in claim 1 wherein the control unit is configured to calculate the event position information including an event location of the sonic event relative to the user vehicle.

6. The system as claimed in claim 1 wherein the control unit is configured to calculate the event position information including an event position heading relative to the user vehicle.

7. The system as claimed in claim 1 wherein the control unit is configured to generate the vehicle operation instruction for autonomous vehicle operation of the user vehicle.

8. A method of operation of a navigation system comprising:
receiving a vehicle external environment information of a user vehicle;
identifying a sonic event from the vehicle external environment information, wherein the sonic event includes sounds associated with a sound of a road based on weather and a road condition, including sound crunching on the road, for the user vehicle;
calculating an event position information of the sonic event relative to the user vehicle; and
generating a vehicle operation instruction for the autonomous vehicle operation and for an alternate route to avoid the sonic event and the event position information for the sound about the road for operating the user vehicle.

9. The method as claimed in claim 8 wherein identifying the sonic event includes identifying the sonic event based on a travel context factor.

10. The method as claimed in claim 8 wherein:
receiving the vehicle external environment information includes receiving the vehicle external environment information as sensor information, including the sonic information, from a sensor unit of the user vehicle; and
identifying the sonic event includes identifying the sonic event based on the sonic information.

11. The method as claimed in claim 8 wherein:
receiving the vehicle external environment information includes receiving the vehicle external environment information as an external source information; and
identifying the sonic event includes identifying the sonic event based on the external source information.

12. The method as claimed in claim 8 wherein calculating the event position information includes calculating an event location of the sonic event relative to the user vehicle.

13. The method as claimed in claim 8 wherein calculating the event position information includes calculating an event position heading of the sonic event relative to the user vehicle.

14. The method as claimed in claim 8 wherein generating the vehicle operation instruction includes generating the vehicle operation instruction for autonomous vehicle operation of the user vehicle.

15. A non-transitory computer readable medium including instructions executable by a control circuit for a navigation system, the instructions comprising:
receiving a vehicle external environment information of a user vehicle;
identifying a sonic event from the vehicle external environment information; wherein the sonic event includes sounds associated with a sound of a road based on weather and a road condition, including sound crunching on the road, for the user vehicle;
calculating an event position information of the sonic event relative to the user vehicle; and
generating a vehicle operation instruction for the autonomous vehicle operation and for an alternate route to avoid the sonic event and the event position information for the sound about the road for operating the user vehicle.

16. The non-transitory computer readable medium as claimed in claim 15, wherein the instructions of identifying the sonic event includes identifying the sonic event based on a travel context factor.

17. The non-transitory computer readable medium as claimed in claim 15, wherein the instructions of:
receiving the vehicle external environment information includes receiving the vehicle external environment information as sensor information, including the sonic information, from a sensor unit of the user vehicle; and
identifying the sonic event includes identifying the sonic event based on the sonic information.

18. The non-transitory computer readable medium as claimed in claim 15, wherein the instructions of:
receiving the vehicle external environment information includes receiving the vehicle external environment information as an external source information; and
identifying the sonic event includes identifying the sonic event based on the external source information.

19. The non-transitory computer readable medium as claimed in claim 15, wherein the instructions of calculating the event position information includes calculating an event location of the sonic event relative to the user vehicle.

20. The non-transitory computer readable medium as claimed in claim 15, wherein the instructions of calculating the event position information includes calculating an event position heading of the sonic event relative to the user vehicle.

* * * * *